US009161252B2

(12) United States Patent
Han et al.

(10) Patent No.: US 9,161,252 B2
(45) Date of Patent: Oct. 13, 2015

(54) METHOD AND APPARATUS FOR REPORTING BUFFER STATUS (75) Inventors: Guanglin Han, Beijing (CN); Yi Jiang, Beijing (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 13/291,719

(22) Filed: Nov. 8, 2011

(65) Prior Publication Data
US 2012/0051255 A1 Mar. 1, 2012

Related U.S. Application Data (63) Continuation of application No. PCT/CN2010/080321, filed on Dec. 27, 2010.

(30) Foreign Application Priority Data

Dec. 25, 2009 (CN) .......................... 2009 1 0189400
Jun. 21, 2010 (CN) .......................... 2010 1 0213922

(51) Int. Cl.
*H04L 1/00* (2006.01)
*H04W 24/10* (2009.01)
*H04L 12/835* (2013.01)
*H04L 12/801* (2013.01)
*H04W 72/12* (2009.01)

(52) U.S. Cl.
CPC ............... *H04W 24/10* (2013.01); *H04L 47/30* (2013.01); *H04L 47/14* (2013.01); *H04W 72/1252* (2013.01); *H04W 72/1284* (2013.01)

(58) Field of Classification Search
CPC ....... H04L 47/30; H04L 47/14; H04W 24/10; H04W 72/1284; H04W 72/1252
USPC .................. 370/252, 329; 455/450–464, 509
See application file for complete search history.

(56) References Cited

U.S. PATENT DOCUMENTS

| 2002/0105951 | A1 | 8/2002 | Hannuksela et al. |
| 2009/0080380 | A1* | 3/2009 | Chun et al. ..................... 370/329 |
| 2009/0232018 | A1* | 9/2009 | Chun et al. ..................... 370/252 |

(Continued)

FOREIGN PATENT DOCUMENTS

| CN | 101340605 A | 1/2009 |
| CN | 101369956 A | 2/2009 |

(Continued)

OTHER PUBLICATIONS

3GPP TS 36.321 v8.7.0 (Sep. 2009) (From Applicant's IDS filed on May 24, 2013).*

(Continued)

*Primary Examiner* — Mang Yeung
(74) *Attorney, Agent, or Firm* — Slater & Matsil, L.L.P.

(57) ABSTRACT

A method and an apparatus for reporting buffer status are provided. The method includes: obtaining multiple Transport Blocks (TBs) from a base station within one Transmission Time Interval (TTI); selecting a TB compliant with a condition of transmitting a Buffer Status Report (BSR) among the multiple TBs; and bearing a BSR of a Logical Channel Group (LCG) and a Control Element (CE) sub-header of the BSR onto the selected TB and sending the TB to the base station. In this way, a UE can make full use of the padding bits of the obtained multiple TBs, and report the buffer status flexibly.

16 Claims, 6 Drawing Sheets

(56) References Cited

U.S. PATENT DOCUMENTS

| | | | |
|---|---|---|---|
| 2009/0285237 A1 | 11/2009 | Chun et al. | |
| 2010/0008236 A1 | 1/2010 | Zhang et al. | |
| 2010/0195614 A1* | 8/2010 | Nimbalker et al. | 370/330 |
| 2010/0272046 A1* | 10/2010 | Guo | 370/329 |
| 2011/0026625 A1* | 2/2011 | Susitaival et al. | 375/260 |
| 2011/0096725 A1 | 4/2011 | Chun et al. | |
| 2012/0099452 A1 | 4/2012 | Dai et al. | |

FOREIGN PATENT DOCUMENTS

| | | | |
|---|---|---|---|
| CN | 101562894 A | 10/2009 | |
| CN | 101925128 | 12/2010 | |
| CN | 101932019 A | 12/2010 | |
| CN | 101953095 A | 1/2011 | |
| CN | 101953096 A | 1/2011 | |
| EP | 2124499 A1 | 11/2009 | |
| KR | 20090101786 A | 9/2009 | |
| RU | 2003127066 | 1/2005 | |
| WO | WO 2009104928 A1 | 8/2009 | |
| WO | WO 2009104929 A1 | 8/2009 | |
| WO | WO 2010145463 A1 | 12/2010 | |

OTHER PUBLICATIONS

Office Action issued in corresponding Chinese Patent Application No. 201010213922.2, mailed Aug. 10, 2011.

Written Opinion of the International Searching Authority issued in corresponding PCT Patent Application No. PCT/CN2010/080321, mailed Mar. 31, 2011.

International Search Report issued in corresponding PCT Patent Application No. PCT/CN2010/080321, mailed Mar. 31, 2011.

LTE, "3$^{rd}$ Generation Partnership Project, Technical Specification Group Radio Access Network, Evolved Universal Terrestrial Radio Access (E-UTRA) Medium Access Control (MAC) Protocol Specification" Release 9. 3GPP TS 36.321, V9.0.0, Sep. 2009.

LTE, "3$^{rd}$ Generation Partnership Project, Technical Specification Group Radio Access Network, Evolved Universal Terrestrial Radio Access (E-UTRA) and Evolved Universal Terrestrial Radio Access Network (E-UTRAN), Overall Description" Stage 2, Release 9. 3GPP TS 36.300, V9.1.0, Sep. 2009.

First page of corresponding granted Chinese Patent No. CN102111808B (Application No. 201010213922.2), citing prior art at Item (56), issued Apr. 25, 2012, 1 page only.

Extended European Search Report for Application No. 13170261.5, Applicant Huawei Technologies Co, Ltd., mailed Jul. 1, 2013, 7 pages.

Extended European Search Report for Application No. 13170262.3, Applicant Huawei Technologies Co, Ltd., mailed Jul. 1, 2013, 9 pages.

Search report issued in corresponding European application No. 10838713.5, Sep. 19, 2012, total 10 pages.

3GPP TS 36.321 V9.0.0, 3rd Generation Partnership Project; Technical Specification Group Radio Access Network; Evolved Universal Terrestrial Radio Access (E-UTRA) Medium Access Control (MAC) protocol specification (Release 9), Sep. 2009, total 44 pages.

Ericsson, "Impact of Carrier Aggregation on the L2 protocol architecture for LTE Rel-10," 3GPP TSG-RAN WG2 #66, Tdoc R2-092957, San Francisco, USA, May 4-8, 2009, total 8 pages.

Alcatel-Lucent Shanghai Bell et al."BSR reporting in Carrier Aggregation," 3GPP TSG-RAN WG2 Meeting #70, R2-102880, Montreal, Canada, May 10-14, 2010, total 4 pages.

Nokia Corporation et al. "BSR remaining issues," 3GPP TSG-RAN WG2 Meeting #70, R2-102957, Montreal, Canada, May 10-14, 2010, total 4 pages.

Office action issued in corresponding U.S. Appl. No. 13/731,186,dated Apr. 3, 2013,total 16 pages.

3GPP TS 36.321 V8.7.0,3rd Generation Partnership Project;Technical Specification Group Radio Access Network; Evolved Universal Terrestrial Radio Access (E-UTRA) Medium Access Control (MAC) protocol specification(Release 8),Sep. 2009,total 47 pages.

\* cited by examiner

| R | R | E | LCID | | | | | Oct 1 |
| F | | | L | | | | | Oct 2 |

FIG. 4

| LCG1 ID | Buffer Size | Oct 1 |
| ... | ... | |
| LCGn ID | Buffer Size | Oct n |

METHOD AND APPARATUS FOR REPORTING BUFFER STATUS

CROSS-REFERENCE TO RELATED APPLICATIONS

This application is a continuation of International Application No. PCT/CN2010/080321, filed on Dec. 27, 2010, which claims priority to Chinese Patent Application No. 200910189400.0, filed on Dec. 25, 2009 and Chinese Patent Application No. 201010213922.2, filed on Jun. 21, 2010, all of which are hereby incorporated by reference in their entireties.

FIELD

The present disclosure relates to the field of wireless communications, and in particular, to a method and an apparatus for reporting buffer status.

BACKGROUND

In the existing Long Term Evolution (LTE) communication system, before an evolved NodeB (eNodeB) schedules resources for a User Equipment (UE), the eNodeB needs to decide the size of resources scheduled to the specific UE. In order to reduce unnecessary waste of radio resources as much as possible, the eNodeB needs to allocate a proper portion of resources to the UE, so as to achieve an objective of making full use of radio resources. To achieve the objective, the UE first needs to report its buffer status to the eNodeB by sending a Buffer Status Report (BSR). The eNodeB comprehensively evaluates factors such as the priority and the quantity of the buffer status of the UE, and finally, initiates data scheduling for the UE.

In the related art, the UE can obtain only one Transport Block (TB) on one carrier within a Transmission Time Interval (TTI), and use the TB to report the buffer status. After the technologies such as a space division multiplexing technology and carrier aggregation are introduced, the UE can obtain multiple TBs within a TTI. However, the related art provides no method about how to report buffer status by using the multiple TBs in a coordinated way.

SUMMARY

The embodiments of the present disclosure provide a method and an apparatus for reporting buffer status so that the UE can report buffer status by using multiple TBs obtained in a TTI in a coordinated way.

An embodiment of the present disclosure provides a method for reporting buffer status, which includes: obtaining multiple TBs from a base station within one TTI; selecting a TB compliant with a condition of transmitting a BSR among the multiple TBs; and bearing a BSR of a Logical Channel Group (LCG) and a Control Element (CE) sub-header of the BSR onto the selected TB and sending the selected TB to the base station.

An embodiment of the present disclosure provides a UE, which includes: an obtaining unit, configured to obtain multiple TBs from a base station within one TTI; a selecting unit, configured to select a TB compliant with a condition of transmitting a BSR among the multiple TBs obtained by the obtaining unit; and a sender, configured to bear a BSR of an LCG and a CE sub-header of the BSR onto the TB selected by the selecting unit and send the TB to the base station.

An embodiment of the present disclosure provides a method for obtaining a BSR, which includes: allocating, by a base station, multiple TBs to a UE within one TTI so that the UE selects a TB compliant with a condition of transmitting the BSR among the multiple TBs; receiving, by the base station, the selected TB from the UE, where the selected TB bears a BSR of an LCG and a CE sub-header of the BSR; and obtaining, by the base station, the BSR of the LCG from the selected TB.

An embodiment of the present disclosure provides a base station, which includes: an allocating unit, configured to allocate multiple TBs to a UE within one TTI so that the UE selects a TB compliant with a condition of transmitting a BSR among the multiple TBs; a receiver, configured to receive the selected TB from the UE, where the selected TB bears a BSR of an LCG and a CE sub-header of the BSR; and a second obtaining unit, configured to obtain the BSR of the LCG from the selected TB received by the receiver.

In the embodiments of the present disclosure, multiple TBs are obtained from the base station within one TTI; a TB compliant with conditions of transmitting a BSR is selected among the multiple TBs; and a BSR of an LCG and a CE sub-header of the BSR are borne in the selected TB and sent to the base station. In this way, the UE can make full use of the padding bits in the obtained multiple TBs, and report the buffer status flexibly.

DETAILED DESCRIPTION OF THE EMBODIMENTS

To make the embodiments of the present disclosure clearer, the following describes the embodiments of the present disclosure in more detail with reference to accompanying drawings.

Figure 1:
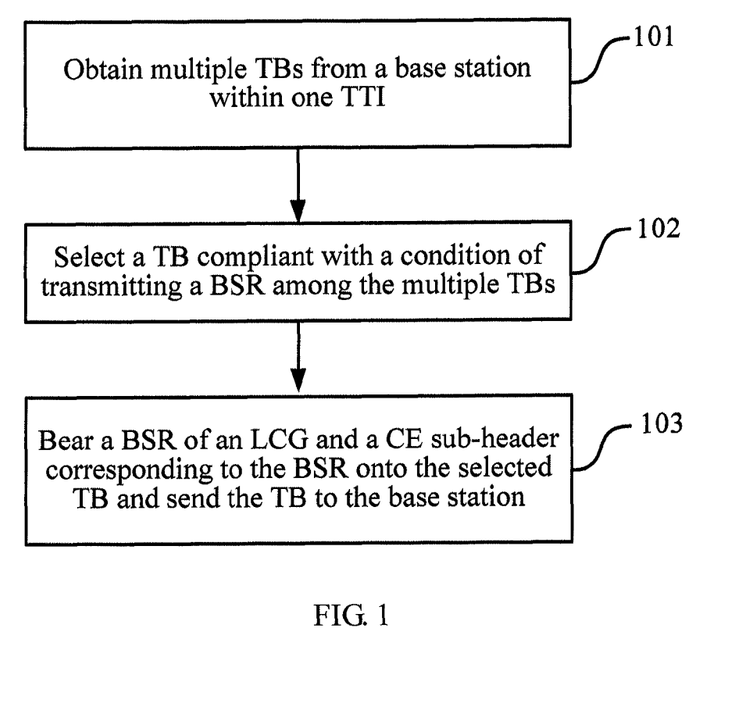
FIG. 1 is a flowchart of a method for reporting buffer status according to an embodiment of the present disclosure.

FIG. 1 shows a method for reporting buffer status according to an embodiment of the present disclosure. As shown in FIG. 1, the specific method process includes the following steps:

Step 101: Obtain multiple TBs from a base station within one TTI.

The base station may be an eNodeB in an LTE system, or an entity of similar functions in other communication systems.

Step 102: Select a TB compliant with a condition of transmitting a BSR among the multiple TBs.

The selected TB may be used for sending a BSR of a Logical Channel Group (LCG).

Step 103: Bear a BSR of an LCG and a CE sub-header corresponding to the BSR onto the selected TB and send the TB to the base station.

Depending on a configuration, one or more LCGs may exist on the UE. For example, in the current LTE system, four LCGs are configured on the UE. When the base station establishes a radio bearer or logical channel for the UE, each bearer or logical channel is configured as belonging to an LCG, but the base station does not need to configure logical channels for all LCGs supported by the UE. Therefore, some LCGs including no logical channel may exist, and these LCGs may be called "non-configured LCGs". The method according to this embodiment of the present disclosure is applicable to the UE on which a random number of LCGs are configured. To describe the selection and the bearing manner of a TB in the most complicated condition, in the embodiment of the present disclosure, multiple LCGs exist on the UE is taken as an example for illustration.

The condition of transmitting a BSR may includes:

The first condition: The padding bits of a single TB are capable of accommodating the BSRs of all LCGs and the Control Element (CE) sub-headers of the BSRs; and/or The second condition: The padding bits of a single TB are capable of accommodating the BSRs of one or more LCGs and the CE sub-headers of the BSRs, but are incapable of accommodating the BSRs of all LCGs and the CE sub-headers of the BSRs.

The padding bits refer to bits left after the TB bears the current service data and other CEs.

Optionally, the conditions of transmitting a BSR may further take the factors such as channel quality and base station configuration into account comprehensively.

For example, when the resources are sufficient, the TB with relatively good channel quality is preferably selected to send the BSR, or the TB with relatively good channel quality is used for sending the BSR of a relatively high priority. The method of judging the priority of the BSR will be described herein later.

According to the priorities of TBs configured by the base station, the BSR is borne and sent in the sequence from a high priority to a low priority of the TBs.

Definitely, based on the foregoing method, at the time of selecting the TB, other factors may be further taken into account expansively, which are not specified here exhaustively.

In the multiple TBs obtained in step 101, multiple TBs compliant with the foregoing condition may coexist. For example, multiple TBs compliant with the first condition may coexist, namely, the TBs are capable of accommodating the BSRs of all LCGs and the CE sub-headers of the BSRs; or, multiple TBs compliant with the second condition coexist; or, one or more TBs compliant with the first condition exist, and one or more TBs compliant with the second condition exist.

Depending on the foregoing different scenarios, the BSRs of part of or all the LCGs on the UE may be transmitted in different bearing modes so that the padding bits in the currently obtained TB are made full use of. Examples are given below for illustration:

EXAMPLE 1

If a TB compliant with the first condition exists in the selected TBs, the BSRs of all LCGs and the CE sub-headers of the BSRs may be borne in the TB compliant with the first condition, and sent to the base station.

Optionally, if multiple TBs compliant with the first condition coexist, the BSRs of all LCGs and the CE sub-headers of the BSRs may be borne in the multiple TBs compliant with the first condition, and sent repeatedly; or, to save radio resources, one of the TBs compliant with the first condition is selected for bearing the BSRs of all LCGs and the CE sub-headers of the BSRs and sent.

Optionally, if one or more TBs compliant with the first condition exist, and one or more TBs compliant with the second condition exist, one TB compliant with the first condition is selected directly to bear the BSRs of all LCGs and the CE sub-headers of the BSRs, thereby saving radio resources and improving transmission efficiency; or, depending on the configured policy, multiple TBs compliant with the condition of transmitting a BSR may be used simultaneously to transmit the BSRs of the LCGs repeatedly, or, the BSRs of different LCGs are combined to form multiple BSRs of different lengths to be borne on different TBs respectively. By analogy, other combination and bearing manners may be obtained.

EXAMPLE 2

If a TB compliant with the second condition exists in the selected TBs, depending on the number (M) of TBs compliant with the second condition, BSRs of LCGs whose number is less than or equal to M may be selected among the BSRs of all LCGs, the BSRs of different LCGs and the corresponding CE sub-headers are borne onto different TBs compliant with the second condition, and the TBs are sent to the base station, where M is an integer greater than 0.

For example, if the total number of the LCGs is greater than M, BSRs of LCGs whose number is less than or equal to M may be selected among the LCGs, then the selected BSRs are borne onto the TBs compliant with the second condition respectively, and the TBs are sent to the base station; or combining the BSRs of multiple LCGs, then the combined BSRs are borne onto the TBs compliant with the second condition respectively, and the TBs are sent to the base station, in which, the BSRs to be combined are the BSRs of all LCGs, or the BSRs to be combined are the selected BSRs, and the number of the selected BSRs is less than or equal to M. If the total number of LCGs is less than M, the BSRs of different LCGs are borne onto the TBs compliant with the second condition respectively, or combining the BSRs of different LCGs, then the combined BSRs are borne onto the TBs compliant with the second condition respectively, and the TBs are sent to the base station. Further, the TBs of good channel quality or a high priority in the M TBs compliant with the second condition are preferably selected to bear the selected BSRs.

When the number of TBs compliant with the condition of transmitting a BSR is limited, and the total padding bits is incapable of bearing the BSRs of all LCGs, the BSRs of the LCGs to be sent within the TTI may be selected according to priority of the BSR of each LCG.

The basis for judging the priority of the BSR of the LCG includes at least one of: buffer status of the logical channel in the LCG; buffer status of the LCG; priority of the logical channel in the LCG; and priority of the LCG.

For example, selection is performed according to the buffer status of the logical channel or the buffer status of the LCG: a BSR corresponding to an LCG with relatively larger buffer status is preferably sent; and/or selection is performed according to the priority of the logical channel in the LCG or the priority of the LCG: a BSR of an LCG with a relatively higher priority of the logical channel or of the LCG is preferably sent.

EXAMPLE 3

If a TB compliant with the second condition exists in the selected TBs, the BSRs of multiple LCGs are combined to form combined BSRs. The length of the combined BSRs and the CE sub-headers of the combined BSRs is less than or equal to a maximum length of padding bits in the TBs compliant with the second condition; the combined BSRs and the CE sub-headers of the combined BSRs are borne onto the TB compliant with the second condition, and the TBs are sent to the base station.

The structure of the existing CE sub-header may be modified to support the foregoing combination mode so that the CE sub-header includes indication information about the BSR length. The indication information may include L used for indicating the length of the BSR, or further include a bit F used for indicating the length L. For example, the value of F is set to 0 or 1. Correspondingly, L is equal to 7 bits if F is set to 0, and L is equal to 15 bits if F is set to 1. In this way, a variable-length BSR can be expressed conveniently and flexibly.

Additionally, before the BSRs of LCGs are borne onto the selected TB(s) and the TB(s) is sent to the base station, the following step may be further included: processing non-configured LCGs. The processing may include: setting the BSRs of the non-configured LCGs to 0 or a null value, or any other content. In this way, the BSRs of the LCGs sent to the base station may include the BSRs of the processed LCGs. A non-configured LCG refers to an LCG that includes no logical channel configured by the base station for the UE, or an LCG that has never appeared in an LCG configuration message. If a BSR of a non-configured LCG in the TB received by the base station is set by the UE to 0 or a null value, the base station believes that the non-configured LCG has no data to be sent; if a BSR of a non-configured LCG in the TB received by the base station is set by the UE to random content, the base station ignores the content.

Furthermore, after the BSR of the LCG and the CE sub-header of the BSR are borne onto the selected TB and the TB is sent to the base station, the following steps may be further included: determining that the BSRs of all the LCGs with data to be sent have been sent to the base station, or that the BSRs of all the LCGs have been sent to the base station; and initializing the trigger event. The trigger event is used to trigger the sending of new BSRs. After determining that the BSRs of all LCGs with data to be sent or the BSRs of all LCGs have been sent to the base station, the UE can initialize the trigger event no matter whether the BSRs have been submitted at a single attempt or at multiple attempts. The determining method may include: comparing the sent BSR of the LCG with the BSR of the LCG to be sent; if they are the same, determining that the BSRs of all LCGs with data to be sent or the BSRs of all LCGs have been sent to the base station. The initialization method may include: starting or restarting a periodical trigger timer of sending the BSR, namely, starting over with timing of triggering the next sending of the BSR, so as to defer the next sending of the BSR; or setting a change value of the buffer status of the LCG to 0, namely, starting over with counting of the increment of the buffer status of the LCG, so as to defer the time when the buffer status exceeds the threshold next time and defer the next sending of the BSR. When the change value of the buffer status exceeds the predetermined threshold, the trigger event is activated to trigger sending of a BSR of an LCG.

Through the method according to this embodiment, after the UE receives multiple TBs, the UE can select the BSRs to be transmitted in this TTI and the TB used for the BSRs flexibly according to various factors such as the padding bits of the TB, the priority of the BSR, and the channel quality. In this way, the resources of the obtained TBs are made full use of, and the utilization of the system resources is improved effectively. By initializing the trigger event, the BSRs may be prevented from being sent frequently within one trigger period, thereby saving air interface resources.

Figure 2:
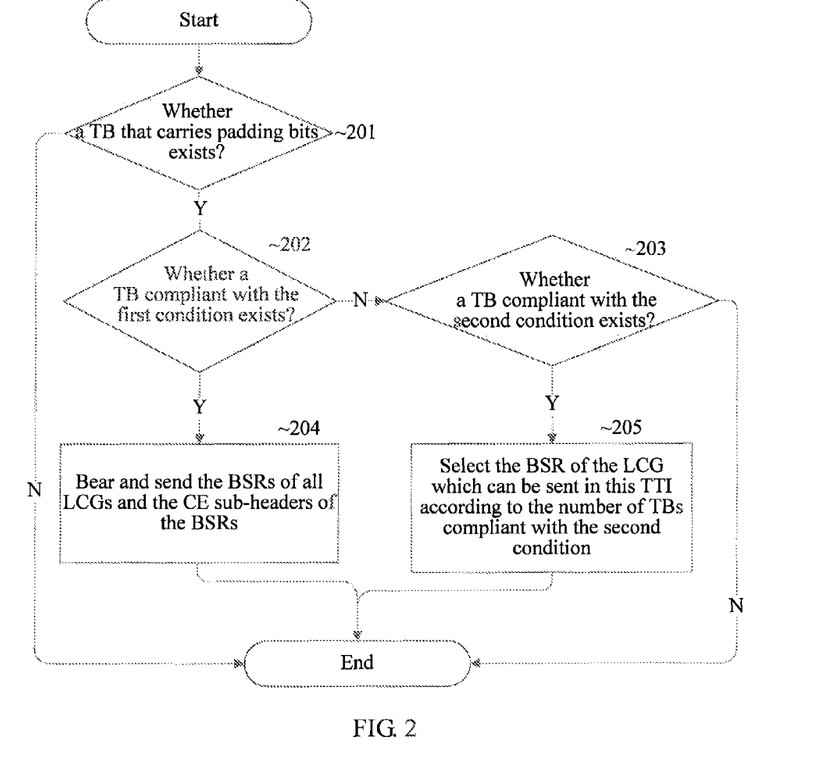
FIG. 2 is a flowchart of applying a method for reporting buffer status according to an embodiment of the present disclosure.

FIG. 2 is a flowchart of applying a method for reporting buffer status according to an embodiment of the present disclosure. The method includes the following steps:

Step 201: In one TTI, a UE receives multiple TBs sent by a base station, and judges whether TBs that carry padding bits exist in the multiple TBs, and, if the TBs exist, step 202 is performed.

Step 202: The UE judges whether a TB compliant with a first condition exists in the TBs that carry padding bits, and step 203 is performed if no such TB exists, or step 204 is performed if such a TB exists.

The first condition includes: The padding bits of a single TB are capable of accommodating the BSRs of all LCGs and the CE sub-headers of the BSRs.

Step 203: Judge whether a TB compliant with a second condition exists, and, if the TB exists, step 205 is performed.

The second condition includes: The padding bits of a single TB are capable of accommodating the BSRs of one or more LCGs and the CE sub-headers of the BSRs, but are incapable of accommodating the BSRs of all LCGs and the CE sub-headers of the BSRs.

Step 204: The UE bears the BSRs of all LCGs and the CE sub-headers of the BSRs onto the TB compliant with the first condition, and sends the TB to the base station. The procedure is ended.

In one TTI, the number of the TBs capable of sending the BSRs of all LCGs may be one or more, and therefore, optionally, to save radio resources and avoid futile retransmission, one of the TBs compliant with the condition may be selected randomly or according to a preset rule such as channel quality and channel priority. The selected TB is used for bearing the BSRs of all LCGs and the CE sub-headers of the BSRs. Alternatively, depending on a requirement, the BSRs of all LCGs and the CE sub-headers of the BSRs are borne on different TBs repeatedly, and sent to the base station.

Additionally, the UE may set a BSR of a non-configured LCG to 0, null or any other content. The BSRs of the LCGs sent to the base station may include the set BSR of the non-configured LCG. The non-configured LCG refers to an LCG that includes no logical channel configured by any one or more base stations for the UE.

Step 205: The UE selects the BSR(s) of the LCG(s) which can be sent in this TTI according to the number of TBs compliant with the second condition, and sends the BSR.

For example, if M TBs meeting the second condition coexist in this TTI, the BSRs of LCGs whose number is less than or equal to M may be selected according to a sequence from a high priority to a low priority of the logical channels of the LCGs, or according to other rules; the BSRs of different LCGs and the corresponding CE sub-headers are borne onto different TBs compliant with the second condition, and the TBs are sent to the base station. Other rules may be:

The priority of the LCG with data is higher than the priority of the LCG without data. The priority may be the LCG priority configured by the network, or the LCG priority determined according to the logical channels in the LCG. For example, the priority of the logical channel with the highest priority in each LCG is used as the priority of the LCG and the priority order between the LCGs is determined according to the relative priority of the logical channel with the highest priority in each LCG.

Optionally, the UE does not report the BSR of the LCG with no data to be sent.

Optionally, the UE does not report the BSR of the LCG which has not been configured by the base station.

Besides, if the BSR of the LCG which has not been configured by the base station needs to be reported, the UE may set the BSR of the LCG to 0, null or any other content. Accordingly, the BSRs of the LCGs sent to the base station may include the set BSR of the non-configured LCG.

In step 205, if no more data needs to be sent in all LCGs after the UE finishes sending the current service data, in order to notify the base station of completion of sending data, the UE may select the LCG of the BSR to be sent randomly or according to a sequence from a high priority to a low priority, and send the BSR of the corresponding LCG and the CE sub-header of the BSR; optionally, the UE does not report a BSR corresponding to an LCG which has not been configured by the eNodeB; if the BSR corresponding to the LCG which has not been configured by the eNodeB is reported, the UE may set the BSR of the LCG to 0, null, or any other content.

The method according to this embodiment is applicable to a scenario, in which the UE and the base station are capable of supporting two transmission modes that transmission is performed with BSRs of all LCGs as a unit or the BSRs of a single LCG as a unit. The UE judges and selects the bearing capacity of the multiple received TBs, so that the UE can select the BSRs to be transmitted in the current TTI flexibly, bear the BSRs onto the available TB, and send the TB to the base station. In this way, the resources of the obtained TBs are made full use of, and the utilization of the system resources is improved effectively. The network obtains the information about the buffer status in the UE, thereby improving efficiency of scheduling the system resources.

Figure 3:
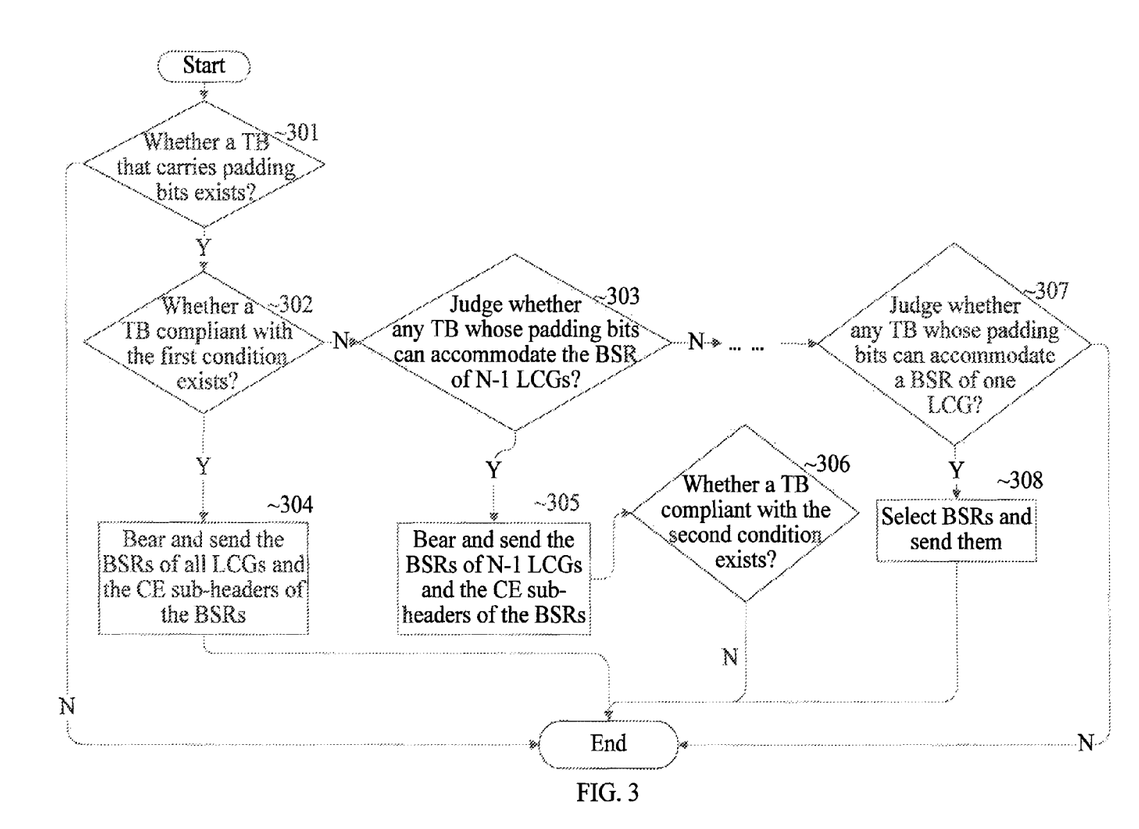
FIG. 3 is a flowchart of applying another method for reporting buffer status according to an embodiment of the present disclosure.

FIG. 3 is a flowchart of applying another method for reporting buffer status according to an embodiment of the present disclosure. It is assumed that the UE includes N (N is an integer greater than 0) LCGs in total, and that the UE supports sending of a truncated BSR, where the truncated BSR is greater than or equal to the BSR(s) of one LCG but is less than the BSRs of N LCGs. The method includes the following steps:

Step 301: In one TTI, the UE receives multiple TBs sent by the base station, and then judges whether TB(s) that carry padding bits exists in the multiple TBs, and, if the TB(s) exists, step 302 is performed.

Step 302: The UE judges whether a TB compliant with a first condition exists in the TB(s) that carries padding bits, and step 303 is performed if no such TB exists, or step 304 is performed if such a TB exists.

The first condition includes: The padding bits of a single TB are capable of accommodating the BSRs of all N LCGs and the CE sub-headers of the BSRs.

Step 303: The UE judges whether any TB whose padding bits can accommodate the BSR(s) of N-1 LCGs and the CE sub-header(s) of the BSR(s) exists, and step 305 is performed if such a TB exists, or the rest may be deduced by analogy if no such TB exists:

The UE continues to judge whether any TB whose padding bits can accommodate the BSR(s) of N-2 LCGs and the CE sub-header(s) of the BSR(s) exists; if such a TB exists, the subsequent steps can be deduced by analogy according to step 305: the BSR(s) of the N-2 LCGs and the CE sub-header(s) of the BSR(s) is borne onto the TB whose padding bits can accommodate the BSR(s) of the N-2 LCGs and the CE sub-header(s) of the BSR(s), the TB is sent to the base station, and details are not described again herein; if no such TB exists, the UE continues to judge whether any TB whose padding bits can accommodate the BSR(s) of N-3 LCGs and the CE sub-header(s) of the BSR(s) exists. If no TB compliant with such conditions exists still, the procedure goes on until step 307.

Step 304: The UE bears the BSRs of all LCGs and the CE sub-headers of the BSRs onto the TB compliant with the first condition, and sends the TB to the base station. The procedure is ended.

In one TTI, the number of the TBs capable of sending the BSRs of all LCGs may be one or more, and therefore, optionally, to save radio resources and avoid futile retransmission, one of the TBs compliant with the condition may be selected randomly or according to a preset rule such as channel quality and channel priority. The selected TB is used for bearing the BSRs of all LCGs. Alternatively, depending on a requirement, the BSRs of all LCGs and the CE sub-headers of the BSRs are borne on different TBs repeatedly, and sent to the base station.

The UE may set the BSR of the LCG not configured by the base station to 0, null or any other content. Accordingly, the BSRs of the LCGs sent to the base station may include the set BSR of the non-configured LCG.

Step 305: The UE bears the BSRs of N-1 LCGs and the CE sub-headers of the BSRs onto the TB compliant with the judgment condition in step 303, and sends the TB to the base station. Afterward, step 306 is performed.

Optionally, before step 305, the UE may select the BSRs of N-1 LCGs randomly or according to a sequence from a high priority to a low priority of logical channels of LCGs, or according to other rules.

Other rules may be:

The priority of the LCG with data is higher than the priority of the LCG without data. The priority may be the LCG priority configured by the network, or the LCG priority determined according to the logical channels in the LCG. For example, the priority of the logical channel with the highest priority in each LCG is used as the priority of the LCG; and the priority order between the LCGs is determined according to the relative priority of the logical channel with the highest priority in each LCG.

Optionally, the UE does not report the BSR of the LCG with no data to be sent.

Optionally, the UE does not report the BSR of the LCG which has not been configured by the base station.

Besides, if any BSR of the LCG not configured by the base station needs to be reported, the UE may set the BSR of the LCG to 0, null or any other content. Accordingly, the BSRs of the LCGs sent to the base station may include the set BSR of the non-configured LCG.

If multiple TBs meeting the judgment conditions in step 303 exist, optionally, to save radio resources and avoid futile retransmission, one of the TBs compliant with the conditions may be selected randomly or according to a preset rule such as channel quality and channel priority. The selected TB is used for bearing the BSRs of the N-1 LCGs and the CE sub-headers of the BSRs. Alternatively, depending on a requirement, the BSRs of the N-1 LCGs and the CE sub-headers of the BSRs are borne on the TBs compliant with the judgment conditions repeatedly, and sent to the base station.

Figure 4:
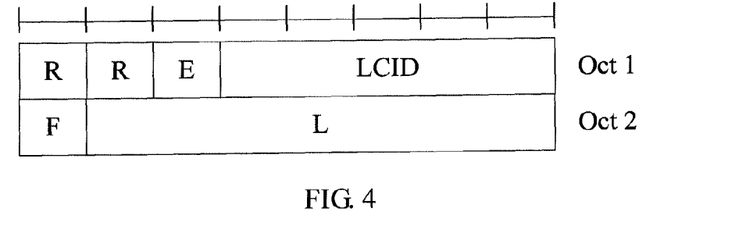
FIG. 4 is a schematic structure diagram of a CE sub-header of a BSR according to an embodiment of the present disclosure.
Figure 5:
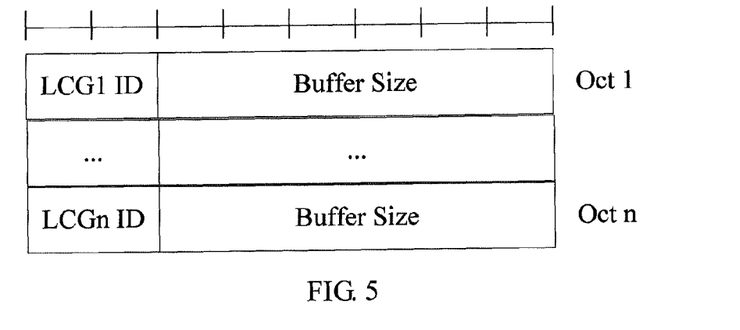
FIG. 5 is a schematic structure diagram of content of a BSR according to an embodiment of the present disclosure.

Optionally, the structure of a Medium Access Control (MAC) CE for bearing the truncated BSR in the TB is shown in FIG. 4 and FIG. 5. A truncated BSR is a BSR of n (1≤n<N) LCGs. A complete BSR includes a CE sub-header of the BSR and content of the BSR. The structure of a CE sub-header of a BSR is shown in FIG. 4, and the structure of the content of a BSR is shown in FIG. 5. In FIG. 4, Oct represents Octet; R represents reserved bits; E indicates whether the current MAC CE is followed by any other MAC CEs, for example, E is set to 1 or 0; LCID is a logical channel identifier, and is set in this position to indicate the type of the currently reported BSR, for example, the type is: the currently sent BSR is a truncated BSR, or the BSR of all LCGs, or the BSR of one LCG; L is used to indicate the length of the BSR; F is used to indicate the length of L, for example, F is set to 0 or 1; accordingly, the length of L is equal to 7 bits if F is set to 0, and the length of L is equal to 15 bits if F is set to 1. In this way, the truncated BSR is expressed conveniently and flexibly. It should be noted that F and L are omissible in the case of reporting the BSR of one LCG or all LCGs. In FIG. 5, LCGn ID represents the ID of the $n^{th}$ LCG; and Buffer Size represents the size of buffer status of the corresponding LCG.

Step 306: If a BSR of any LCG not yet sent still exists in the UE, it is judged whether any TB compliant with a second condition exists. The second condition includes: The padding bits of a single TB are capable of accommodating the BSRs of one or more LCGs and the CE sub-headers of the BSRs, but are incapable of accommodating the BSRs of all LCGs and the CE sub-headers of the BSRs. If any TB compliant with the second condition exists, the BSRs of the remaining LCGs and the CE sub-headers of the BSRs are borne onto the TB compliant with the second condition, and the TB is sent to the base station; and if no TB compliant with the second condition exists, the procedure is ended.

Step 307: Judge whether any TB whose padding bits can accommodate the BSR of one LCG and the CE sub-header of the BSR, and step 308 is performed if such a TB exists, or the procedure is ended if no such TB exists.

308. The UE selects the BSR(s) of the LCG(s) capable of being sent in this TTI according to the number of TBs capable of accommodating the BSR of one LCG, and sends the selected BSR(s).

The detailed method of selection and sending is similar to that in step 205, and is not repeated here any further.

If no more data needs to be sent in all LCGs after the UE finishes sending the current service data, in order to notify the base station of completion of sending data, the UE may select the LCG of the BSR to be sent randomly or according to a sequence form a high priority to a low priority, and send the BSR of the corresponding LCG and the CE sub-header of the BSR; optionally, the UE does not report the BSR corresponding to the LCG which has not been configured by the eNodeB; if any BSR corresponding to the LCG which has not been configured by the eNodeB needs to be reported, the UE may set the BSR of the LCG to 0, null, or any other content.

The method according to this embodiment is applicable to a scenario that the UE supports sending of truncated BSRs. The UE judges and selects the bearing capacity of the multiple received TBs in a sequence from large to small, so that the UE can select the BSRs to be transmitted in the current TTI flexibly, bear the BSRs onto the available TB(s), and send the TB(s) to the base station. Moreover, in combination with the MAC CE structure put forward in this embodiment of the present disclosure, the transmission of truncated BSRs is enabled. In this way, the resources of the obtained TBs are made full use of, and the utilization of the system resources is improved effectively. The network obtains the information about the buffer status in the UE, thereby improving efficiency of scheduling the system resources.

Persons of ordinary skill in the art should understand that part of the steps of the method according to any embodiment of the present disclosure may be implemented by a program instructing relevant hardware. The program may be stored in computer-readable storage medium such as Read-Only Memory (ROM)/Random Access Memory (RAM), magnetic disk, or optical disk.

Figure 6:
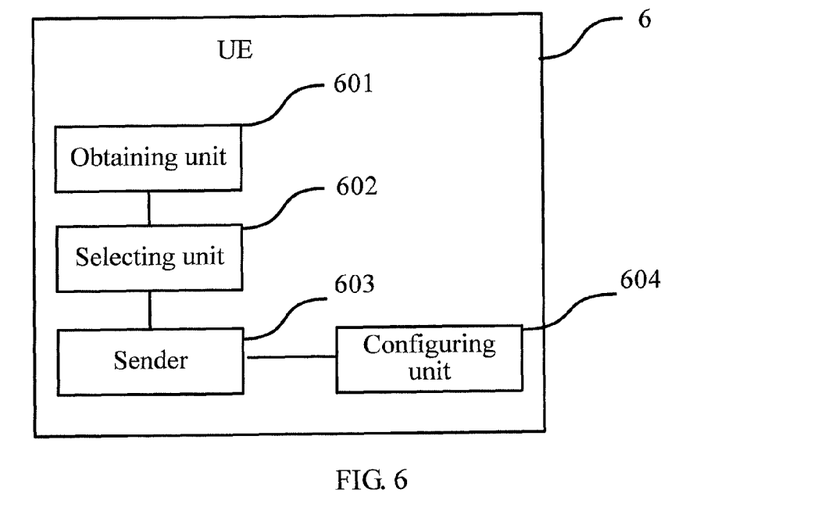
FIG. 6 is a schematic structure diagram of a UE according to an embodiment of the present disclosure.

FIG. 6 shows a UE 6 according to an embodiment of the present disclosure. The UE 6 implements the method according to the foregoing method embodiment, and includes an obtaining unit 601, a selecting unit 602, and a sender 603.

The obtaining unit 601 is configured to obtain multiple TBs from a base station within one TTI.

The selecting unit 602 is configured to select a TB compliant with a condition of transmitting a BSR among the multiple TBs obtained by the obtaining unit 601.

The condition of transmitting a BSR include:

The first condition: The padding bits of a single TB are capable of accommodating the BSRs of all LCGs and the CE sub-headers of the BSRs; and/or The second condition: The padding bits of a single TB are capable of accommodating the BSRs of one or more LCGs and the CE sub-headers of the BSRs, but are incapable of accommodating the BSRs of all LCGs and the CE sub-headers of the BSRs.

The sender 603 is configured to bear a BSR of an LCG and a CE sub-header of the BSR onto the TB selected by the selecting unit 602 and send the TB to the base station.

Depending on the TBs compliant with different conditions selected by the selecting unit 602, the sender 603 is specifically configured to:

bear the BSRs of all LCGs and the CE sub-headers of the BSRs in a TB compliant with the first condition, and send the TB to the base station, if the TB compliant with the first condition exists in the TBs selected by the selecting unit 602; and/or select BSRs of LCGs whose number is less than or equal to M among the BSRs of all LCGs depending on the number (M) of TBs compliant with the second condition, bear the BSRs of the selected different LCGs and the CE sub-headers of the BSRs onto different TBs compliant with the second condition, and send the TBs to the base station, if the TBs compliant with the second condition exist in the TBs selected by the selecting unit 602, where M is an integer greater than 0; and/or combine BSRs of multiple LCGs to form combined BSRs if TBs compliant with the second condition exist in the TBs selected by the selecting unit 602, in which the length of the combined BSRs and the CE sub-headers of the combined BSRs is less than or equal to a maximum length of padding bits in the TBs compliant with the second condition; and bear the combined BSRs and the CE sub-headers of the combined BSRs onto the TBs compliant with the second condition, and send the TBs to the base station.

Optionally, the sender is further configured to: load indication information about the length of the BSR into the CE sub-header, bear the CE sub-header loaded with the indication information and the BSR of the LCG onto the TB selected by the selecting unit, and send the TB to the base station.

The indication information may include L used for indicating the length of the BSR, or further include a bit F used for indicating the length L. For example, the value of F is set to 0 or 1. Correspondingly, L is equal to 7 bits if F is set to 0, and L is equal to 15 bits if F is set to 1. In this way, a variable-length BSR can be expressed conveniently and flexibly.

Optionally, the UE 6 may further include:

a configuring unit 604, configured to process a non-configured LCG, and transmit a BSR of the processed LCG to the sender, where the processing includes: setting the BSR of the non-configured LCG to 0 or a null value, or any other content.

Accordingly, the sender is further configured to send the BSR of the LCG processed by the configuring unit to the base station.

Figure 7:
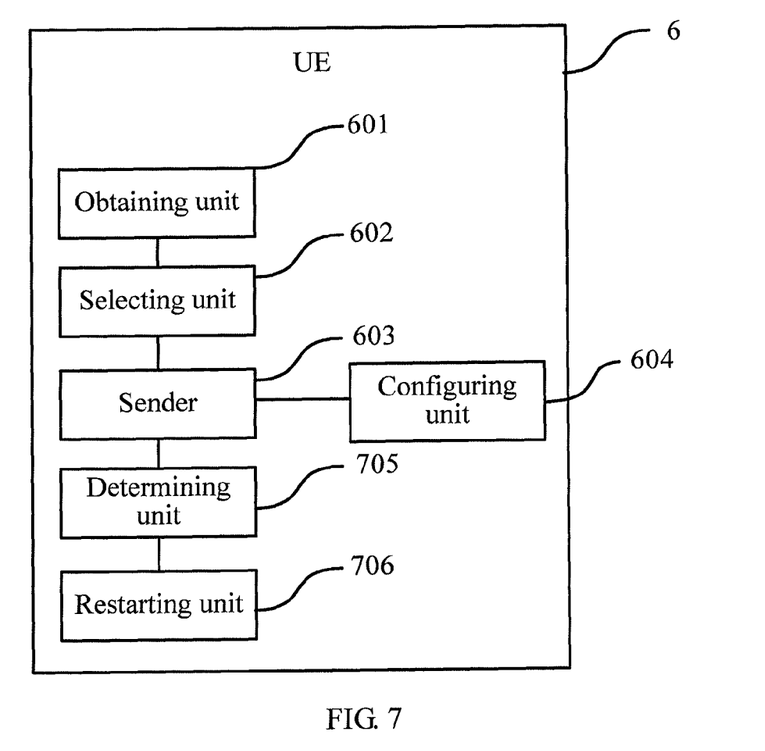
FIG. 7 is a schematic structure diagram of another UE according to an embodiment of the present disclosure.

Optionally, the UE described in this embodiment of the present disclosure may further include: a determining unit 705, configured to determine that the BSRs of all LCGs with data to be sent or the BSRs of all LCGs have been sent to the base station; and an initializing unit 706, configured to initialize a trigger event which is used to trigger sending of a new BSR. After determining that the BSRs of all LCGs with data to be sent or the BSRs of all LCGs have been sent to the base station, the UE can initialize the trigger event no matter whether the BSRs have been submitted at a single attempt or at multiple attempts. The determining method may include: comparing the sent BSR of the LCG with the BSR of the LCG to be sent; if they are the same, determining that the BSRs of all LCGs with data to be sent or the BSRs of all LCGs have been sent to the base station. The initialization method may include: starting or restarting a periodical trigger timer of sending the BSR, namely, starting over with timing of triggering the next sending of the BSR, so as to defer the next sending of the BSR; or setting the change value of the buffer status of the LCG to 0, namely, starting over with counting of the increment of the buffer status of the LCG, so as to defer the time when the buffer status exceeds the threshold next time and defer the next sending of the BSR. When the change value of the buffer status exceeds the predetermined threshold, the trigger event is activated to trigger sending of the BSR of the LCG.

The UE according to this embodiment judges and selects the bearing capacity of the multiple received TBs, so that the UE can select the BSRs to be transmitted in the current TTI flexibly, bear the BSRs onto the available TB(s), and send the TB(s) to the base station. In this way, the resources of the obtained TBs are made full use of, and the utilization of the system resources is improved effectively. The network obtains the information about the buffer status in the UE, thereby improving efficiency of scheduling the system resources. The initializing unit initializes the trigger event, so as to prevent the BSRs from being sent frequently within one trigger period and save air interface resources.

Figure 8:
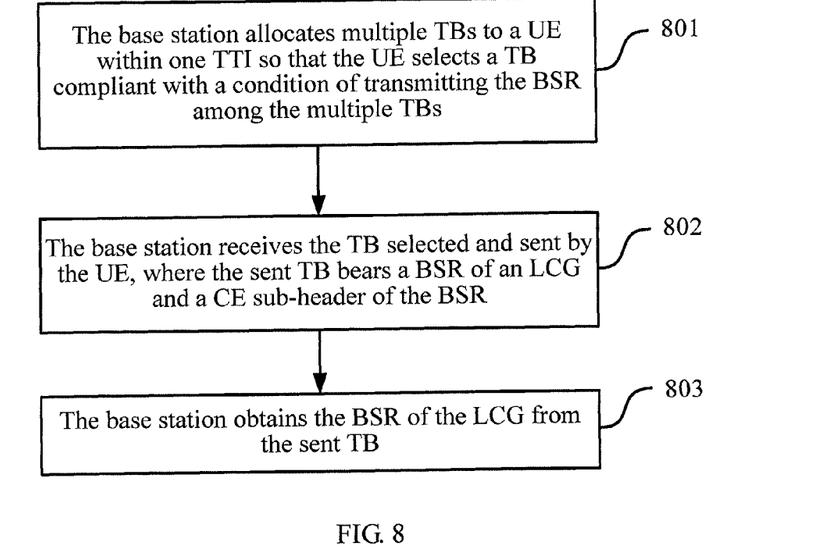
FIG. 8 is a flowchart of a method for obtaining a BSR according to an embodiment of the present disclosure.

FIG. 8 shows a method for obtaining a BSR according to an embodiment of the present disclosure. This method corresponds to the UE side method described above, and the specific method process includes the following steps:

Step 801: The base station allocates multiple TBs to a UE within one TTI so that the UE selects a TB compliant with a condition of transmitting a BSR among the multiple TBs.

The base station may be an eNodeB in the LTE system, or an entity of similar functions in other communication systems. The selected TB is used for sending the BSR of the LCG.

Step 802: The base station receives the TB selected among the multiple TBs and sent by the UE, where the sent TB bears a BSR of an LCG and a CE sub-header of the BSR.

For more details about the conditions of transmitting the BSR, how the UE selects the TB compliant with conditions of transmitting the BSR among the multiple TBs, and how to use the selected TB for bearing the BSR of the LCG and the CE sub-header of the BSR, reference is made to the description in the embodiment shown in FIG. 1.

Step 803: The base station obtains the BSR of the LCG from the sent TB.

The BSRs of the LCGs may include:

a BSR corresponding to an LCG configured by the base station for the UE; and/or a BSR corresponding to an LCG which has not been configured by the base station, where the LCG which has not been configured refers to an LCG that has never appeared in a configuration message in the process of configuring the logical channels, or an LCG that includes no logical channel. The configuration message may be an LCG configuration message.

After step 803, the method may further include the following steps.

If a BSR of a non-configured LCG borne in the TB sent by the UE and received by the base station is set by the UE to 0 or a null value, the base station believes that the non-configured LCG has no data to be sent; or If a BSR of a non-configured LCG borne in the TB sent by the UE and received by the base station is set by the UE to random content, the base station ignores the BSR corresponding to the non-configured LCG. In this way, the UE does not need to set the data of this part to specific content, thereby reducing complexity of the processing of the UE; moreover, the base station ignores the content, namely, does not resolve this content, thereby reducing complexity of the processing of the base station.

Figure 9:
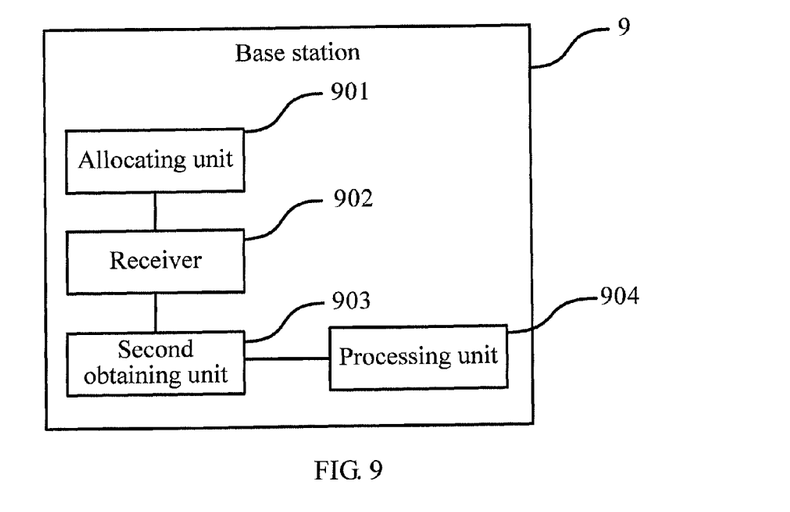
FIG. 9 is a schematic structure diagram of a base station according to an embodiment of the present disclosure.

FIG. 9 shows a base station 9 according to an embodiment of the present disclosure. The base station 9 implements the base station side method according to the foregoing method embodiment, and includes:

an allocating unit 901, configured to allocate multiple TBs to a UE within one TTI so that the UE selects a TB compliant with a condition of transmitting the BSR among the multiple TBs;

a receiver 902, configured to receive the TB selected and sent by the UE among the TBs allocated by the allocating unit 901, where the sent TB bears a BSR of an LCG and a CE sub-header of the BSR; and a second obtaining unit 903, configured to obtain the BSR of the LCG from the sent TB received by the receiver 902.

Optionally, the base station may further include:

a processing unit 904, configured to perform corresponding processing on the BSR of the LCG obtained by the second obtaining unit 903, where the processing includes the following step:

if a BSR corresponding to a non-configured LCG in the sent TB is set by the UE to 0 or a null value, the processing unit 904 believes that the LCG has no data to be sent; or if a BSR corresponding to a non-configured LCG in the sent TB is set by the UE to random content, the processing unit 904 ignores the BSR corresponding to the LCG.

Through the base station side method and apparatus according to the embodiments of the present disclosure, the base station flexibly processes the BSR of the LCG reported by the UE, and complexity of the processing of the base station and the UE is reduced.

It should be noted that all or part of the units described above may be integrated in a chip. All functional units in the embodiments of the present disclosure may be integrated into a processing module or existent independently, or two or more of such units are integrated into one module. The integrated module may be hardware or a software module. When being implemented as a software module and sold or applied as an independent product, the integrated module may be stored in a computer-readable storage medium. The storage medium may be a Read-Only Memory (ROM), magnetic disk, or optical disk.

The accompanying drawings and the relevant descriptions are intended for expounding the principles of the present disclosure only, but are not intended to limit the scope of the present disclosure. For example, message names and entities in the embodiments of the present disclosure may vary with the network type, and some messages are omissible. Any modification, equivalent replacement, or improvement made without departing from the spirit and principles of the present disclosure shall fall within the scope of the present disclosure.

Although the present disclosure is described through some exemplary embodiments, the present disclosure is not limited to such embodiments. It is apparent that those of ordinary skill in the art can make modifications and variations to the present disclosure without departing from the spirit and scope of the present disclosure.

What is claimed is:

1. A method for reporting buffer status applied in carrier aggregation, comprising:
   obtaining, by a user equipment (UE) configured with at least one logical channel group (LCG), a plurality of transport blocks (TBs) in a transmission time interval (TTI) from a base station;
   selecting, by the UE, from the plurality of TBs, a TB that meets a buffer status report (BSR) transmission condition, wherein in instances where, among the plurality of TBs obtained in the TTI, there is more than one TB meeting the BSR transmission condition, all the more than one TB meeting the BSR transmission condition are selected for BSR transmission;
   carrying onto each selected TB, by the UE, a BSR of an LCG and a control element (CE) sub-header corresponding to the BSR; and
   sending, by the UE, the BSR and the corresponding CE sub-header to the base station via each selected TB,
   wherein the at least one LCG of the UE includes a LCG which does not contain any logical channel, the method further comprises:
   processing, by the UE, the LCG which does not contain any logical channel by setting a buffer value of the BSR of the LCG which does not contain any logical channel to 0 or to a null value.

2. The method according to claim 1, wherein the BSR transmission condition indicates that padding bits of a single TB are sufficient to accommodate BSRs of all the LCGs of the UE plus a CE sub-header corresponding to the BSRs of all the LCGs;
   the carrying step provides for including of the BSRs of all the LCGs and the corresponding CE sub-header onto each selected TB; and
   the sending step provides for transmission of the BSRs of all the LCGs and the corresponding CE sub-header via each selected TB.

3. The method according to claim 1, wherein the CE sub-header comprises indication information about a length of the BSR.

4. The method according to claim 1, wherein the BSR transmission condition indicates that padding bits of a single TB are sufficient to accommodate a BSR of one or more LCGs plus a CE sub-header corresponding to the BSR of the one or more LCGs, but insufficient to accommodate BSRs of all the LCGs plus the CE sub-header corresponding to the BSRs of all the LCGs,
   the carrying step provides: carrying onto each selected TB a truncated BSR and a CE sub-header corresponding to the truncated BSR, a total size of the truncated BSR plus the corresponding CE sub-header being not less than a size of a BSR of a single LCG plus the CE sub-header corresponding to the BSR of the single LCG, and being not greater than a size of the padding bits of each selected TB; and
   the sending step provides a transmission of the truncated BSR and the corresponding CE sub-header via each selected TB.

5. The method according to claim 4, wherein the truncated BSR is the BSR of the LCG with the highest priority.

6. A communications system supporting carrier aggregation, the system comprising
   a user equipment (UE) comprising a processor and a transmitter configured to be communicatively connectable to a base station, wherein the UE is configured with at least one logical channel group (LCG) and is configured to:
   obtain, from the base station, a plurality of transport blocks (TBs) within a transmission time interval (TTI);
   select, from the plurality of TBs a TB that meets a buffer status report (BSR) transmission condition, wherein in instances where, among the plurality of TBs obtained in the TTI, there is more than one TB meeting the BSR transmission condition, all the more than one TB meeting the BSR transmission condition are selected for BSR transmission;
   carry a BSR of an LCG and a control element (CE) sub-header corresponding to the BSR of the LCG onto each selected TB; and
   transmit, to the base station, the BSR of the LCG and the corresponding CE-header via each selected TB,
   wherein the at least one LCG of the UE includes a LCG which does not contain any logical channel, the UE is further configured to process the LCG which does not contain any logical channel by setting a buffer value of the BSR of the LCG which does not contain any logical channel to zero or to a null value.

7. The communications system according to claim 6, wherein the BSR transmission condition indicates that padding bits of a single TB are sufficient to accommodate BSRs of all the LCGs of the UE plus a CE sub-header corresponding to BSRs of all the LCGs, and wherein the BSRs of all the LCGs and the CE sub-header corresponding to the BSRs of all the LCGs are carried onto each selected TB and are transmitted by the UE, via each selected TB, to the base station.

8. The communications system according to claim 6, wherein the BSR transmission condition indicates that padding bits of a single TB are sufficient to accommodate a BSR of one or more LCGs plus a CE sub-header corresponding to the BSR of the one or more LCGs, but insufficient to accommodate BSRs of all the LCGs plus the CE sub-header corresponding to the BSRs of all the LCGs,
   the UE is configured to carry a truncated BSR and a CE sub-header corresponding to the truncated BSR onto each selected TB and transmit the truncated BSR and the corresponding CE sub-header, via each selected TB, to the base station,
   wherein a total size of the truncated BSR plus the CE sub-header corresponding to the truncated BSR is not less than a size of a BSR of a single LCG plus the CE sub-header corresponding to the BSR of the single LCG, and is not greater than a size of the padding bits of each selected TB.

9. The communications system according to claim 8, wherein the truncated BSR is the BSR of the LCG with the highest priority.

10. The communications system according to claim 6, wherein the base station is an evolved Node B.

11. The communications system according to claim 6, wherein the CE sub-header comprises indication information about a length of the BSR.

12. A user equipment (UE) supporting carrier aggregation, the UE comprising:
a receiver;
a processor; and
a transmitter communicatively connected to the processor, wherein the UE is configured with at least one logical channel group (LCG);
wherein the receiver is configured to obtain, from a base station, a plurality of transport blocks (TBs) within a transmission time interval (TTI);
wherein the processor is configured to select, from the plurality of TBs, a TB that meets a buffer status report (BSR) transmission condition, wherein in instances where, among the plurality of TBs obtained in the TTI, there is more than one TB meeting the BSR transmission condition, all the more than one TB meeting the BSR transmission condition are selected for BSR transmission, and to include into each selected TB a BSR of an LCG and a control element (CE) sub-header corresponding to the BSR of the LCG;
wherein the transmitter is configured to transmit, via each selected TB, the BSR and the corresponding CE sub-header to the base station,
wherein the at least one LCG of the UE includes a LCG which does not contain any logical channel, the UE is further configured to process the LCG which does not contain any logical channel by setting a buffer value of the BSR of the LCG which does not contain any logical channel to zero or to a null value.

13. The UE according to claim 12, wherein the BSR transmission condition indicates that padding bits of a single TB are sufficient to accommodate BSRs of all the LCGs of the UE plus a CE sub-header corresponding to the BSRs of all the LCGs,
the processor is configured to include the BSRs of all the LCGs and the corresponding CE sub-header onto each selected TB, and
the transmitter is configured to transmit, to the base station, the BSRs of all the LCGs and the corresponding CE sub-header via each selected TB.

14. The UE according to claim 12, wherein the BSR transmission condition indicates that padding bits of a single TB are sufficient to accommodate a BSR of one or more LCGs plus a CE sub-header corresponding to the BSR of the one or more LCGs, but insufficient to accommodate BSRs of all the LCGs plus the CE sub-header corresponding to the BSRs of all the LCGs,
the processor is configured to include a truncated BSR and a CE sub-header corresponding to the truncated BSR into each selected TB, and
the transmitter is configured to transmit, to the base station, the truncated BSR and the corresponding CE sub-header via each selected TB,
wherein a total size of the truncated BSR plus the corresponding CE sub-header is not less than a size of a BSR of a single LCG plus a CE sub-header corresponding to the BSR of the single LCG, and is not greater than a size of the padding bits of each selected TB.

15. The UE according to claim 14, wherein the truncated BSR is the BSR of the LCG with the highest priority.

16. The UE to claim 12, wherein the CE sub-header comprises indication information about a length of the BSR.

* * * * *